United States Patent [19]
Freeland et al.

[11] 3,903,788
[45] Sept. 9, 1975

[54] APPARATUS FOR SMOKE AND HEAT PROCESSING OF FOOD PRODUCTS

[75] Inventors: Harold L. Freeland, Waelder; James C. Flanagan, Corpus Christi, both of Tex.

[73] Assignee: Koch Supplies Inc., Kansas City, Mo.

[22] Filed: Oct. 15, 1973

[21] Appl. No.: 406,575

[52] U.S. Cl. ............... 99/475; 99/481; 308/77
[51] Int. Cl.² ................................. A23B 4/04
[58] Field of Search ........... 99/467, 474, 475, 476, 99/481; 34/418, 419, 431, 423; 308/9, 77

[56] References Cited
UNITED STATES PATENTS

| | | | |
|---|---|---|---|
| 2,733,001 | 1/1956 | McDonald | 308/77 |
| 2,832,278 | 4/1958 | Taranik | 99/475 |
| 3,209,675 | 10/1965 | Stimpson | 99/473 |
| 3,705,461 | 12/1972 | Parkes | 34/219 |

FOREIGN PATENTS OR APPLICATIONS

| | | | |
|---|---|---|---|
| 744,723 | 2/1956 | Canada | 99/481 |

*Primary Examiner*—Peter Feldman
*Assistant Examiner*—Alan Cantor
*Attorney, Agent, or Firm*—Lowe, Kokjer, Kircher, Wharton & Bowman

[57] ABSTRACT

Apparatus for smoke and heat processing of food products, in accordance with the present invention, comprises an enclosure within which may be disposed a quantity of food products on carts or trucks for transporting and handling the same. A pair of blower operated ducts may be disposed within the enclosure and may include a plurality of linearly arranged, spaced nozzles that direct the flow of heated, smoke laden air downwardly along the walls of the enclosure toward the floor. Baffles are arranged in parallel spaced relation from the walls of the enclosure and receive the downwardly directed flow of smoke laden air from the nozzles and direct such flow upwardly and inwardly through the food product being processed. The air is charged with smoke and is electrically heated to an optimum temperature as it is forced through the ducts by a blower mechanism. The bearings of the blower mechanism are shielded from contact with the air in the product zone and are provided with a forced air bearing cooling system that is negatively pressured with respect to the pressure within the enclosure. The enclosure is lined with panels of stain resistant materials which panels are joined by means of expansion joints that seal the enclosure and allow the enclosure to be internally cleaned by a spray cleaning mechanism also incorporated into the enclosure.

9 Claims, 13 Drawing Figures

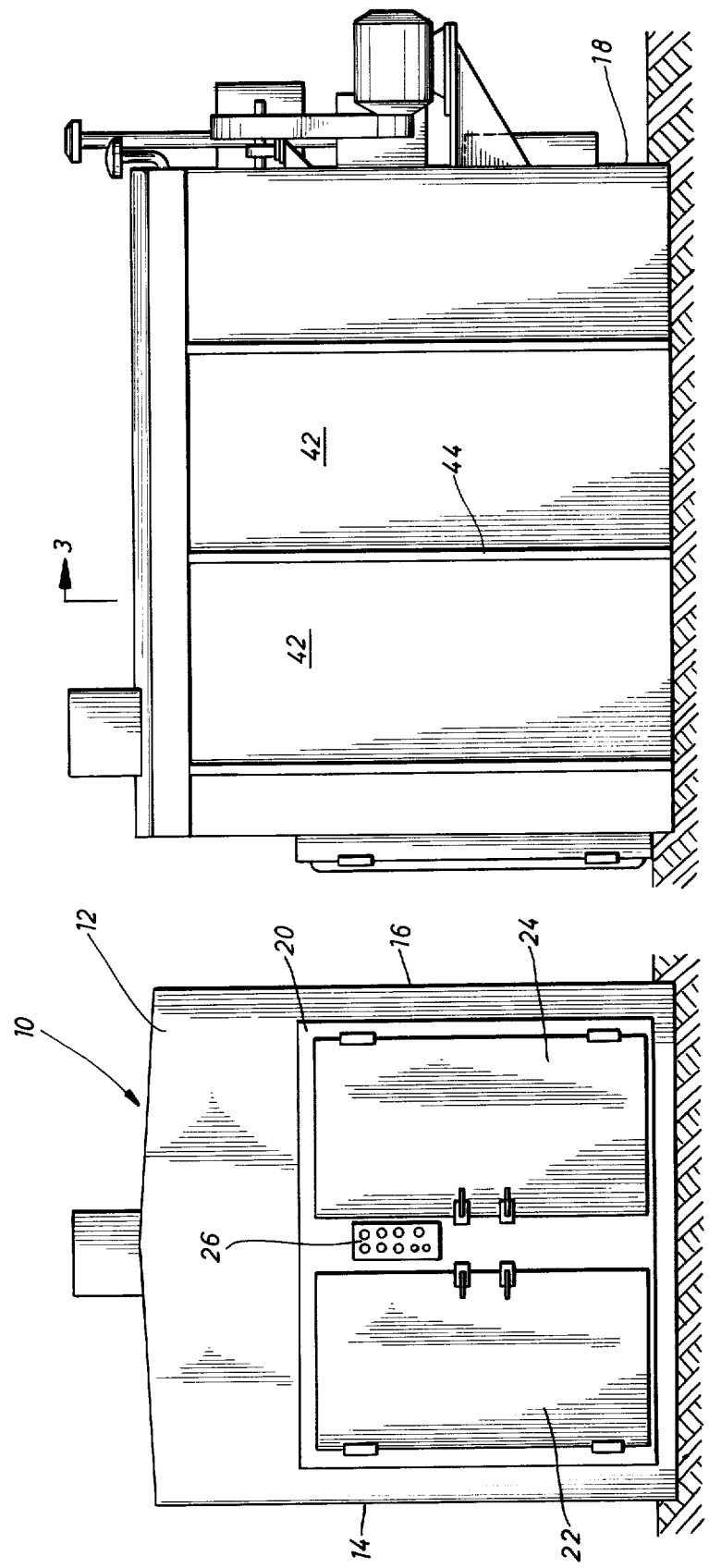

APPARATUS FOR SMOKE AND HEAT PROCESSING OF FOOD PRODUCTS

FIELD OF THE INVENTION

This invention relates generally to apparatus for smoke and heat processing of food products and more specifically relates to smokehouse apparatus wherein food products such as meat, fish and poultry are cured by application of heat and smoke for a predetermined period of time and which apparatus includes means for directing circulation of smoke laden air within an enclosure in such manner to achieve efficient smoke and heat processing of the food products to insure production of competitive, quality products for the smoked food product market.

BACKGROUND OF THE INVENTION

It has long been desirable for certain food products, such as bacon, ham, fish and poultry, to process such food products by application of smoke and heat until the products become cured to the point that they may be kept for long periods of time without perishing. Although food products have been pre-cooked and smoke-cured since ancient times, conventional smoke curing of food products, because of recent laws and ordinances that protect the consumer, must be very carefully controlled and handled in a sanitary manner in order that the food product may be acceptable for human consumption.

Smoke curing has been commercially accomplished in the immediate past by placing food products within an enclosure, commonly referred to as a smokehouse, where heated and smoke laden air is forced into the enclosure in order to allow the food product to be pre-cooked and smoke-cured. To generate the heat that is necessary for pre-cooking of the food product, it is typical for gas burners to be provided and for air to be continuously brought into the burner mechanism where it is heated by the gas flame and is then transported to the product zone within the enclosure by means of blowers. The oxygen content within the enclosure remains quite high and the humidity is typically quite low. It is typically necessary to alternately bring in outside air and heat the air during processing of the food product and to add either liquid or artificially generated smoke to the air as it is brought in. Obviously, when air is brought in, used or expended air must be ejected from the enclosure and, it is typical for smoke curing enclosures to be provided with vents to allow smoke laden air to escape from the enclosure as fresh air is brought in. This contributes to smoke pollution of the atmosphere and is generally considered intolerable. It is common in many localities in which smoke curing apparatus has been utilized in the past, for governments to enact new ordinances against smoke pollution of the atmosphere. It is, therefore, highly desirable to provide smoke and heat curing apparatus for processing food products which apparatus does not release a quantity of smoke to the atmosphere at any time.

Most smoke cured food products are sold by weight and therefore it is desirable for commercial food product organizations to maintain the final weight of the processed food product as high as possible in order to maintain the economic feasibility of the process. For example, where link or ring sausage is cured, it is typical, when utilizing conventional smoke curing apparatus, for the smoke cured sausage to yield approximately 78 percent of its original weight. It would, of course, be desirable to cure the sausage in such manner that it retains approximately 100 percent of its original weight. It is desirable to cook a food product until the internal temperature of a product reaches a predetermined optimum temperature. For example, ring sausage may be processed in heat and smoke curing apparatus having a processing temperature of 220° F until the internal temperature thereof reaches 140° F, at which temperature the product is considered cooked. It is also desirable that the product, when fully cooked, have optimum characteristics of taste and color in order that it be commercially acceptable as well as fully cured. Where heat and smoke are cyclically introduced by conventional heat and smoke processing mechanisms that require freshly heated and smoke laden air to be periodically introduced, it is difficult to achieve proper cooking, smoke curing and color characteristics and also provide a product of approximately 100 percent its original weight. It is even more difficult to fully smoke and heat process sausage and other meat products in less than an eight hour period.

When fans and blowers are disposed within an enclosure provided for smoke and heat curing of food products, it is desirable for good mechanical and thermal efficiency, for the bearings that support the fans and blowers to be located as near as possible to the rotating blower cage or fan. It is not desirable, however, to place bearings in the product zone of enclosures provided for smoke curing of food products because of the possibility of the lubricant of the bearings causing contamination of the product zone. In fact, many ordinances expressly prohibit placement of exposed bearings within the product zone of smoke curing apparatus because of the likelihood of contamination. When bearings are physically located within the product zone of smoke and heat curing apparatus for food products, it is typically required that the bearings be completely enclosed and separated from the air in the product zone. Where the bearings are so placed and enclosed, the operating life thereof is generally limited to a severe degree. Enclosed bearings tend to overheat and deteriorate quite rapidly in an enclosed environment.

Where a flow of coolant, such as atmospheric air, is transported to bearings disposed within the enclosure defined by the smokehouse, it is possible that bearing shaft seals and perhaps also the conduit conducting the flow of coolant may develop a leak and the bearing lubricant may contaminate the product zone of the enclosure. It is desirable therefore to provide means for preventing contamination of the product zone if the bearing coolant system should develop a leak.

Accordingly, it is a primary object of the present invention to provide novel apparatus for smoke and heat processing of food products which comprises an enclosure having means disposed therein to direct a flow of smoke laden air upwardly and inwardly through the food product contained therein and insuring that the food product may be equally processed on all sides thereof and cured to an optimum degree by application of smoke and heat.

It is also an object of the present invention to provide novel apparatus for smoke and heat curing of food products which apparatus requires a much shorter period of processing than is ordinarily necessary and which may be operated at very low cost to yield a product having qualitites of excellent commercial feasibility.

Another object of the present invention contemplates the provision of novel smoke and heat curing apparatus that provides for processing of food products wherein the products retain nearly 100 percent of the original weight thereof during processing, thereby further enhancing the commercial feasibility of food products so processed.

It is an even further object of the present invention to provide novel smoke and heat processing apparatus having internal ducts and blowers for creating an optimum flow of smoke laden air within the enclosure which blowers are mounted by bearings that are shielded from contact with the product zone within the enclosure and are provided with a cooling system for maintaining the bearings at an optimum operating temperature.

An even further object of the present invention contemplates the provision of a bearing cooling system that directs the flow of cooling medium to the bearings of the blowers and which cooling medium is maintained at a negative pressure as compared to the pressure within the enclosure, thereby insuring that possible leakage of the bearing cooling system will not cause contamination of the product and of the smoke laden air within the enclosure.

It is also an important feature of the present invention to provide wall panels within the enclosure which panels are composed of stain resistant material and are assembled by means of expansion joints to allow expansion and contraction of the panels as the enclosure is heated and cooled and yet maintains a sealed relationship between the panels.

It is another object of the present invention to provide novel apparatus for smoke and heat processing of food products wherein the internal wall surfaces of a smokehouse enclosure are free of projections such as rivets, nails, and other fastening devices, thereby promoting efficient cleaning of the internal wall surfaces of the enclosure.

Another important object of the present invention concerns the provision of novel apparatus for smoke and heat processing of food products wherein an enclosure defining a smokehouse is provided with means for automatically spray cleaning all of the exposed internal surfaces of the enclosure after each batch of food products has been processed and for spraying the food products during processing.

It is also an important object of the present invention to provide novel apparatus for smoke and heat processing of food products, which apparatus is of simple nature, is low in cost and reliable in use.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may comprise a sealed and insulated enclosure having openings therein through which carts or trucks of food products may be introduced for the purpose of smoke and heat processing of the food products. Positioning devices may be employed to properly position the carts of food products within the enclosure. A pair of ducts may be disposed within the enclosure for the purpose of circulating heated and smoke laden air within the enclosure for smoke and heat curing of the food products and the ducts may be provided with a plurality of nozzles arranged in linear array along the walls of the enclosure to direct a flow of air downwardly along the walls toward the floor of the enclosure.

To achieve proper circulation of heated and smoke laden air through the food products baffles project upwardly from the floor of the enclosure in spaced relation with the walls thereof and achieve reversal and even distribution of the flow of heated air being directed downwardly by the nozzles, thereby causing the flow of air to move evenly through the food products supported by the carts. Blowers are provided in the ducts and have an air inlet disposed at the upper central portion of the enclosure to further enhance the flow of air in an upward and inward manner.

Each of the blowers are supported within the enclosure by means of bearings and the bearings are shielded from contact with the air in the product zone by bearing enclosures. Each of the bearing enclosures is communicated with a coolant system that conducts a flow of coolant medium, such as filtered air, to the bearing enclosures, thereby maintaining the bearings at an optimum operating temperature. A scavenger blower is provided with its inlet connected to the coolant system, which blower causes air to be drawn through a filter means and drawn into the bearing cooling system by the suction created at the inlet of the blower. The coolant system is maintained under lower pressure than the pressure within the enclosure, thereby insuring that any leakage that takes place will cause air to flow from the enclosure into the cooling system and the air within the enclosure cannot be contaminated by leakage of the coolant system. Likewise, the enclosure is maintained at a positive pressure to insure maintenance of a sanitary condition within the enclosure which is the product zone and is provided with an alarm system that sounds and renders the apparatus inoperative if proper operating pressure is not maintained.

The entire internal surface area of the enclosure is lined with panels of stain resistant material, which material is joined together by means of expansion joints that allow relative movement of the panels as they become heated and cooled during operation of the smokehouse mechanism. The expansion joints maintain an efficient seal to prevent leakage of smoke laden air from the enclosure, to prevent air from leaking into the enclosure and to provide an internal surface area that may be easily cleaned of any foreign matter that might accumulate thereon. The enclosure is also provided with a plurality of spray nozzles connected to a spray system which may be selectively actuated to cause the entire internal surface area of the enclosure to be subjected to a spray of water in order that the enclosure may be maintained as clean as possible. The spray system may also be energized during processing of the food product. The floor of the enclosure incorporates a drain and water trap that effectively carries away any foreign matter such as smoke particles that might have accumulated on the wall structure of the enclosure during operation thereof.

BRIEF DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the embodiment hereof which is illustrated in the appended drawings, which drawings form a part of this specification.

It is to be noted however, that the appended drawings illustrate only typical embodiments of the invention and are therefore not to be considered limiting of its scope, for the invention may admit to other equally effective embodiments.

In the Drawings:

FIG. 1 is an end elevational view of smokehouse apparatus constructed in accordance with the present invention and illustrating the control panels and food product entry doors of the smokehouse apparatus.

FIG. 2 is a side elevational view of the smokehouse apparatus of FIG. 1.

FIG. 3 is a sectional view of the smokehouse of FIGS. 1 and 2 taken along line 3—3 in FIG. 2.

FIG. 4 is a rear elevational view of the smokehouse apparatus of FIGS. 1 and 2.

FIG. 5 is a sectional view of the inside portion of the enclosure taken along line 5—5 in FIG. 4.

FIG. 6 is a sectional view in plan taken along line 6—6 in FIG. 5.

FIG. 7 is a fragmentary elevational view of a duct inspection opening and the closure therefor.

FIG. 8 is a fragmentary sectional view taken along line 8—8 in FIG. 7.

FIG. 9 is a sectional view of a bearing enclosure having a blower shaft extending therethrough and having a blower shaft bearing disposed therein.

FIG. 10 is a sectional of the wall structure of the enclosure illustrating an expansion joint and its relationship to the other mechanical parts of the enclosure.

FIG. 10a is a sectional view illustrating the slip joint connection between adjacent wall panels.

Figure 11:
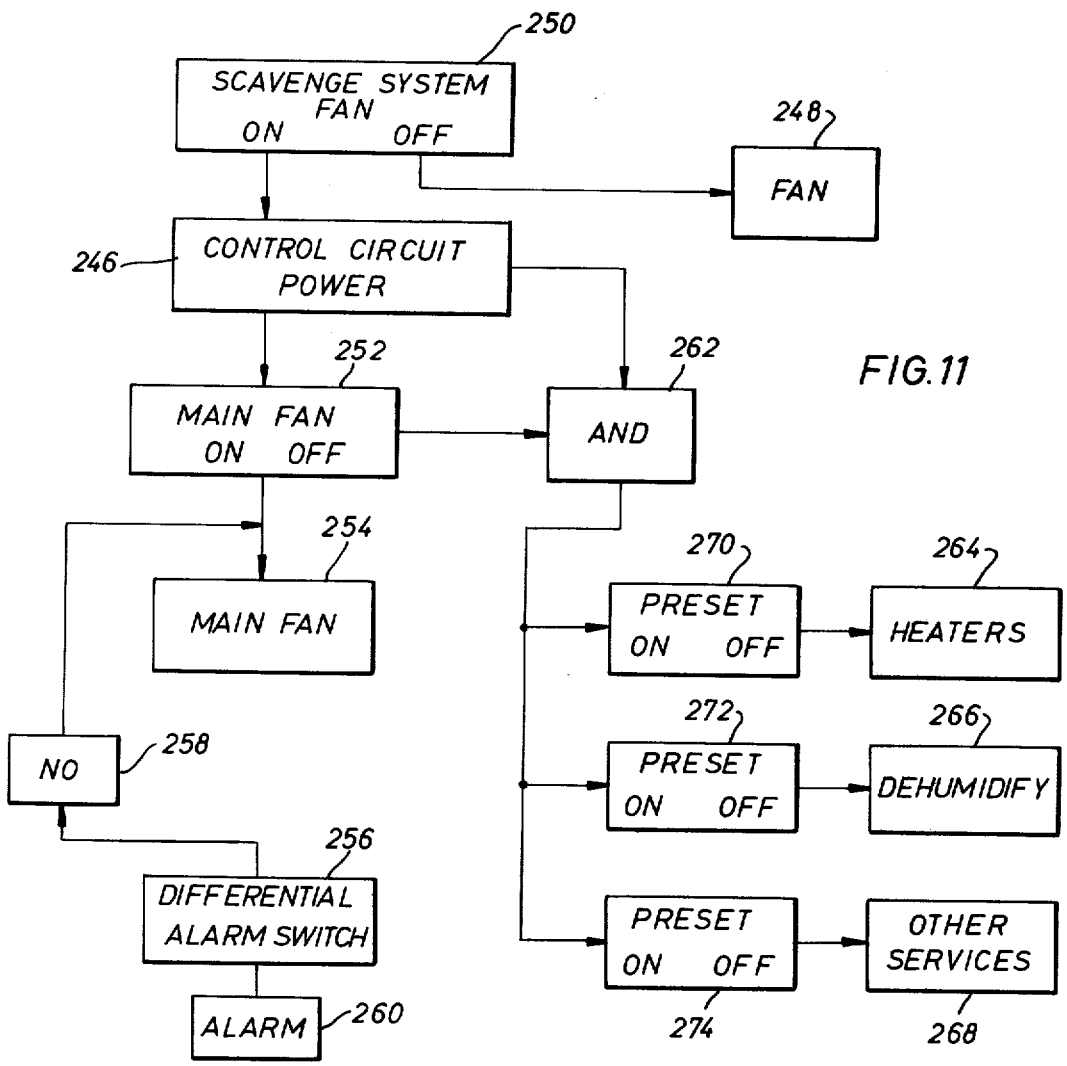

FIG. 11 is an electrical/pneumatic block schematic illustrating the control circuitry of the present invention.

Figure 12:
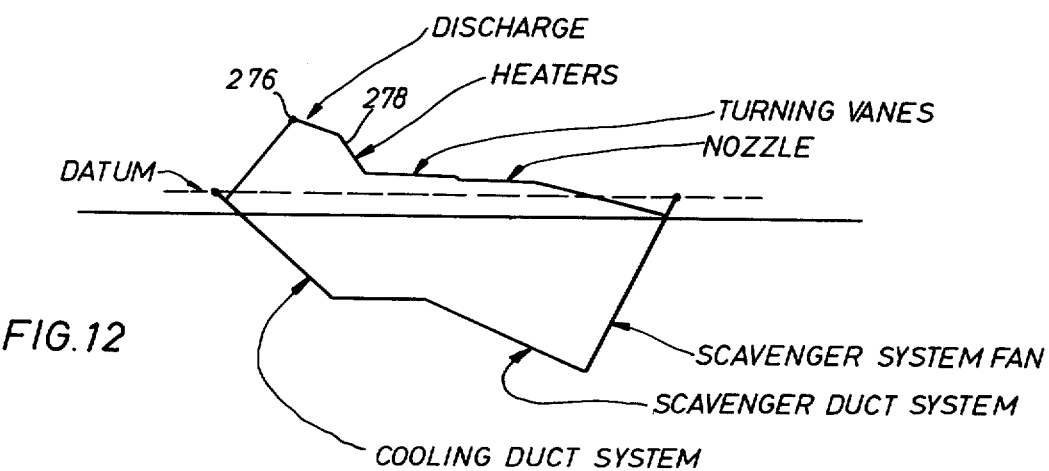

FIG. 12 is a pressure gradient diagram depicting the various pressures within the product zone and within the cooling and scavenger duct systems, which pressures are compared to a datum pressure.

DESCRIPTION OF PREFERRED EMBODIMENT

Referring now to the drawings for a more detailed understanding of the present invention and referring first to FIG. 1, there is disclosed an enclosure or smokehouse, illustrated generally at 10, having a front wall 12, a pair of side walls 14 and 16, and a rear wall 18. A door frame 20 may be provided in the front wall 12 of the enclosure and may support a pair of product doors 22 and 24 through which carts or trucks of food product may be introduced into the enclosure for smoke and heat curing of the product. A control panel 26 may be provided on the door frame 20, thereby enabling an operator to monitor and control the conditions within the enclosure at all times during the smoke and heat curing process.

Figure 6:
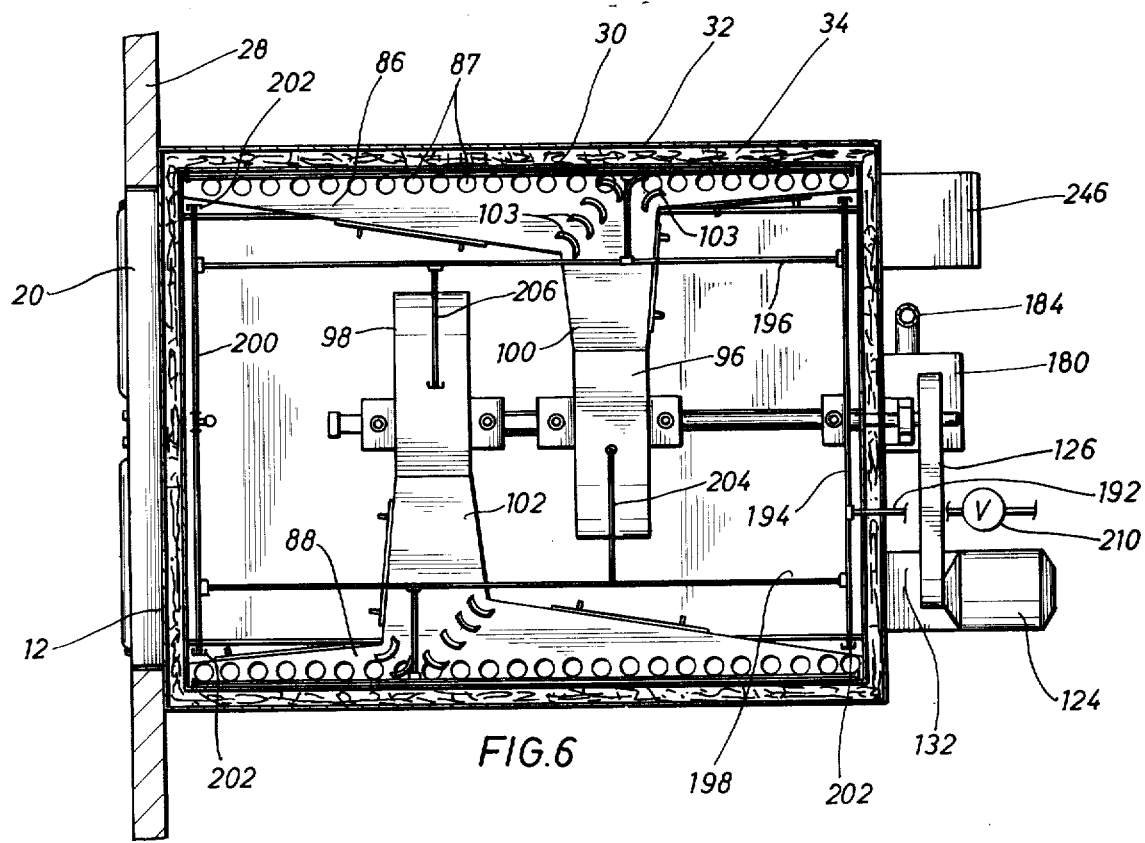
Figure 5:
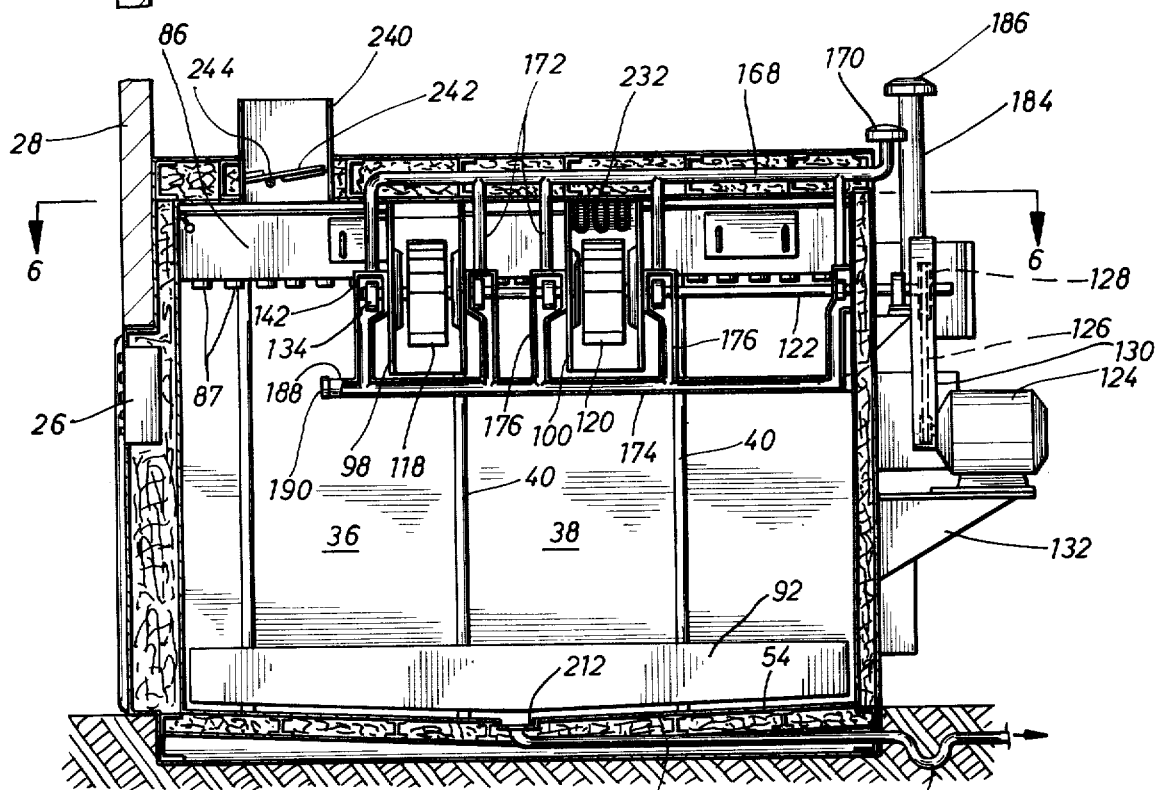

As illustrated in FIGS. 5 and 6, the door frame 20 may project outwardly from the front wall 12 of the enclosure by a distance equalling the thickness of a wall 28 of a building for which the smokehouse apparatus is desired. A rectangular opening may be formed in the wall 28 of the building that is of sufficient dimension to receive the projecting door frame structure 20 of enclosure and the doors 22 and 24 may open into the building while the smokehouse enclosure may be disposed outside of the building. It is not necessary, therefore, to modify the structure of a building to any substantial degree in order to facilitate addition of the smokehouse enclosure thereto.

The wall structure of the enclosure may incorporate inner and outer stain resistant surfaces 30 and 32 as illustrated in FIG. 6 having a thickness of insulation material 34 disposed therebetween. Inner panels of stain resistant material, such as stainless steel, may be utilized to line the interior of the enclosure and the panels may be joined by means of an expansion joint that allows relative movement of the panels during heating and cooling of the enclosure and yet maintains a watertight seal between the panels. The expansion joints may be covered by vertical battens 40, thereby presenting an interior surface of the enclosure that is smooth and free of projections such as rivets, screws and the like and will not readily become contaminated by smoke particles adhering thereto. Moreover, the interior surface area of the enclosure may be readily cleaned by spray cleaning when cleaning is desirable. The exterior of the enclosure may also be covered with panels 42 of stain resistant material which may also be joined by means of expansion joints covered with vertical battens 44. The exterior surface area of the enclosure may also be simply and efficiently cleaned and will not tend to collect unusual amounts of foreign matter because there are no exposed rivet, bolt or screw heads that might otherwise collect foreign matter.

Figures 9, 10, 10A:
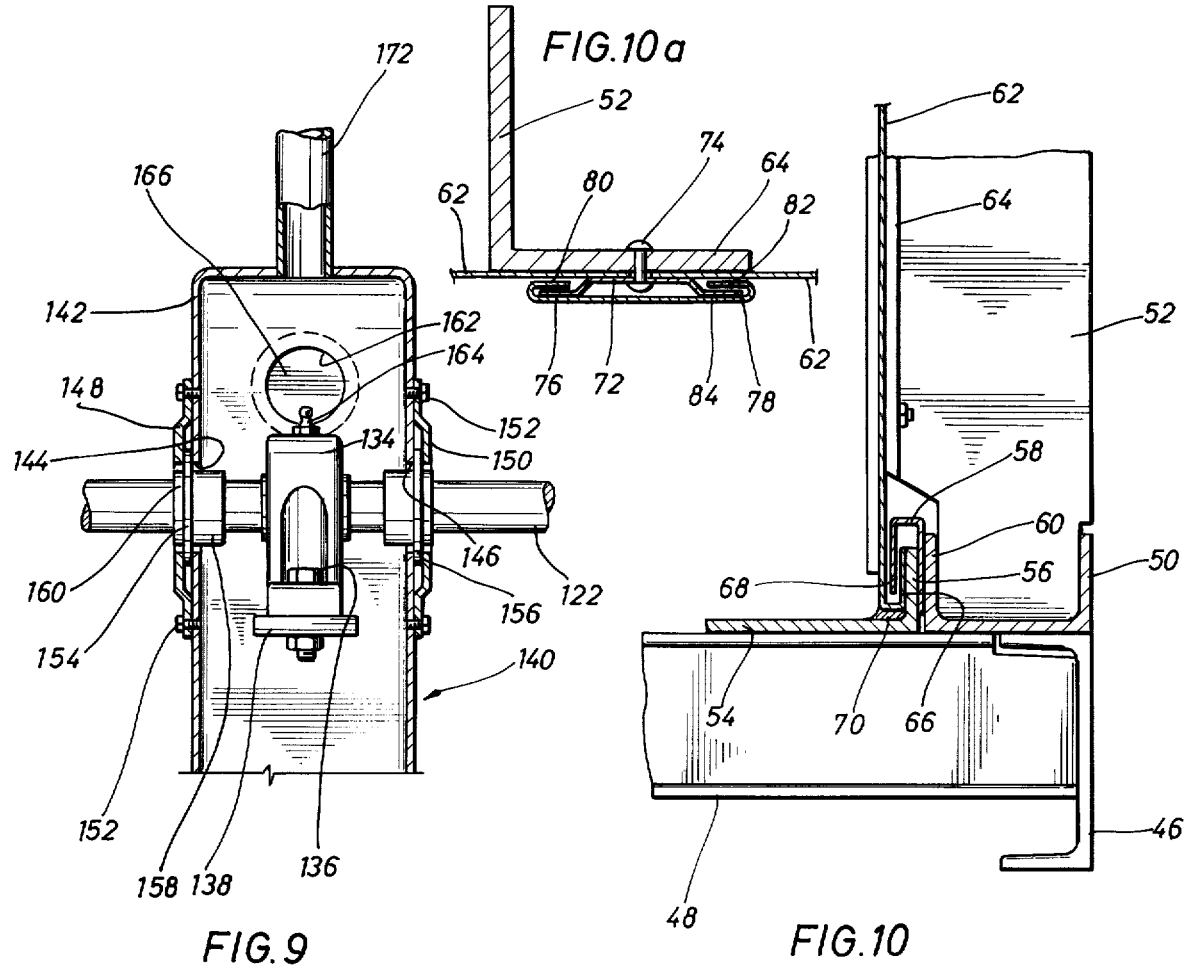

Referring now to FIGS. 10 and 10a, the panels are provided with slip joint connection means at both the wall and floor connections and the connections between panels. In FIG. 10 a slip joint is illustrated which establishes a movable connection between the panel at the connection between the wall and floor, while in FIG. 10a a slip joint is provided that establishes a movable connection between adjacent panel structures. Referring now to FIG. 10, a floor frame may be provided having reinforcing channels and beams 46 and 48, respectively, that may be connected by welding or by any other acceptable means of connection. A channel element 50 may be connected in any suitable manner to the floor frame structure and may support upright wall structural elements 52. The floor 54 of the enclosure, which may be composed of any one of a number of suitable floor materials, such as metal, fiberglass or any other material that may be readily cleaned by means of a water spray, may be provided with an upturned edge portion 56 that may be disposed in abutting relationship with a reverse bent slip joint bracket 58 to secure the bracket in immovable relation between the upturned edge 56 and a flange 60 of the channel member 50.

Panels 62 of stain resistant material, such as stainless steel or the like, may be disposed in abutting relation with support flanges 64 of the upright wall structural elements 52 and the panels may be movably secured relative to the upright structural elements by means of a slip joint connection as illustrated in FIG. 10a. The lowermost portion of each of the panels may be provided with a reverse bent portion 66 that may receive the downturned portion 68 of the bracket 58, thereby providing a mechanical connection that will not allow water to leak past the panels into the wall structure of the enclosure. A sealant material 70 may be introduced immediately below the reverse bent portion 66 of the panels in order to provide added sealing ability and to prevent smoke particles and other foreign matter from accumulating below the reverse bent portions of the panels.

As shown in FIG. 10a vertical edges of the panels 62 may be retained in abutting relationship with the flanges 64 of the upright wall structural elements 52 by means of panel securing clips 72 that are retained in assembly with the flanges 64 by means of rivets 74. The clips 72 are bent in such a manner that edge portions 76 and 78 thereof are disposed in spaced relation with the panels 62, thereby providing spaces for receiving the reverse bend edge portions 80 and 82 of vertical batten members 84. The batten members provide a weather cover for the slip joint connection between the panels to prevent moisture and air leakage between the panels and the battens also present a smooth exterior surface, thereby allowing the internal and external wall structures of the enclosure to be easily cleaned.

Figure 3:
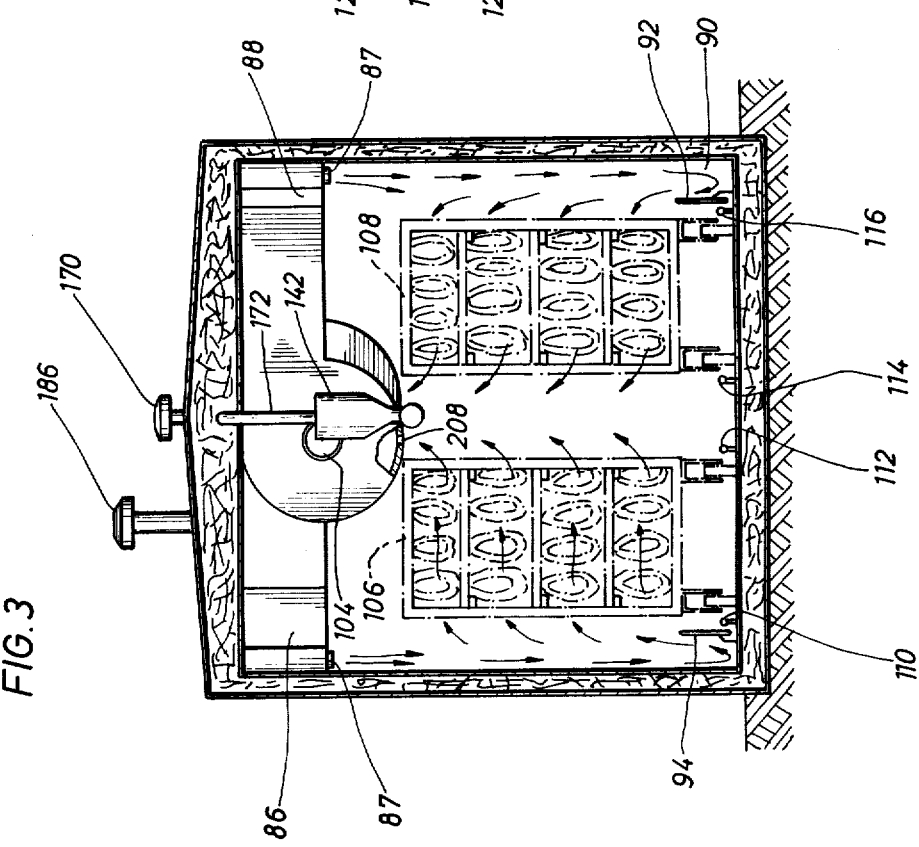

With reference now particularly to FIGS. 3, 5 and 6, within the enclosure and at the upper side portions thereof are disposed a pair of elongated ducts 86 and 88 having a linearly disposed array of downwardly directed nozzles 87, which nozzles are disposed immediately adjacent the respective side walls of the enclosure. Each nozzle directs a flow of heated and smoke laden air from the respective duct downwardly along the side walls of the enclosure as shown by means of flow arrows in FIG. 3. The flow of air from the nozzles enters a diffusing and distribution trough 90 defined by the side walls and floor of the enclosure and by upstanding baffles 92 and 94 that are secured to the floor structure of the enclosure in any suitable manner. Upon entering the trough 90, the flow of air from each of the nozzles is diffused into a smooth, stable and broad flow that is directed upwardly by the baffels and directed inwardly by the combined effect of the downwardly flowing air along the walls of the enclosure and by suction created at the inlets 104 of a pair of blowers 96 and 98 that are disposed in communication with the ducts 86 and 88 respectively by connecting ducts 100 and 102. Turning vanes 103 are disposed within the ducts at the outlets of the connecting ducts and serve to provide a smooth flow transition as the flow of air changes direction upon reaching the ducts from the blowers. The turning vanes also serve to properly divide the flow of air and direct it toward appropriate portions of the ducts.

The air inlets 104 of each of the blowers are disposed at the upper central portion of the enclosure and thereby cause the diffused flow of air to flow inwardly and upwardly from the troughs 90 where it enters the blowers and is prepared for recirculation within the enclosure. As shown in FIG. 3, the arrows indicate the direction of air movement through carts or trucks 106 and 108 of food product being smoke and heat processed within the enclosure. Cart guide rails 110, 112, 114 and 116 are secured to the floor structure of the enclosure and serve to properly position the carts of food product within the enclosure to insure optimum smoke and heat processing of the food product.

Referring now particularly to FIGS. 5 and 9, the blowers 98 and 100 are cage type blowers having cage elements 118 and 120 disposed respectively therein, both of the blowers are carried by a blower shaft 122, the shaft being indirectly driven by an electric drive motor 124 connected through a drive belt 126 to a pulley 128 connected to the shaft. A belt guard 130 is disposed about the belt and pulleys to provide a safe environment for workmen that may be in the vicinity of the smokehouse apparatus. The motor 124 may be suitably connected to a support 132 that projects outwardly from the enclosure structure.

It will be desirable to support the rotary cage elements 118 and 120 by means of bearings and to provide protection for the product zone against the adverse effects of bearing contamination. According to the present invention, one suitable bearing and product zone protective structure is illustrated in FIG. 9, wherein a bearing element 134 is secured by means of bolts 136 to a bearing support bracket 138 that is disposed in fixed relation to the enclosure structure. If desired, the support 138 may be fixed to the support structure or, in the alternative, it may be carried by the blower housing structure, which housing structure may be fixedly supported to the roof structure of the enclosure.

In order to prevent contamination of the product zone, each of the bearings may be provided with a bearing enclosure, such as illustrated generally at 140 in FIG. 9, wherein a bearing enclosure 142 is provided having openings 144 and 146 for receiving the blower drive shaft 122. A pair of cover plates 148 and 150 may be secured to the bearing enclosure 142 by means of bolts 152 and may have a central portion that is spaced from the wall structure of the enclosure sufficiently to receive seal elements 154 and 156, respectively, in such manner as to define a dynamic seal to prevent contaminants from entering into the product zone enclosure. The seal elements 154 and 156 may be composed of a friction resistant material and may be lightly in contact with both the external wall structure of the bearing structure and with the internal surface area of the seal brackets 148 and 150 thereby insuring positive maintenance of a seal during rotation of the shaft 122 relative to the bearing housing structure. The seal elements 154 and 156 may be retained in assembly with the shaft 122 by internal and external retainer elements 158 and 160 that may be secured to the shaft 122 in any desirable manner. The bearing enclosure 142 may be provided with an opening 162 through which a grease gun adapter may be inserted and connected to a grease fitting 164 for the purpose of lubricating the bearing 134. A cover plate 166 may provide a sealed closure for the opening 162.

Figure 4:
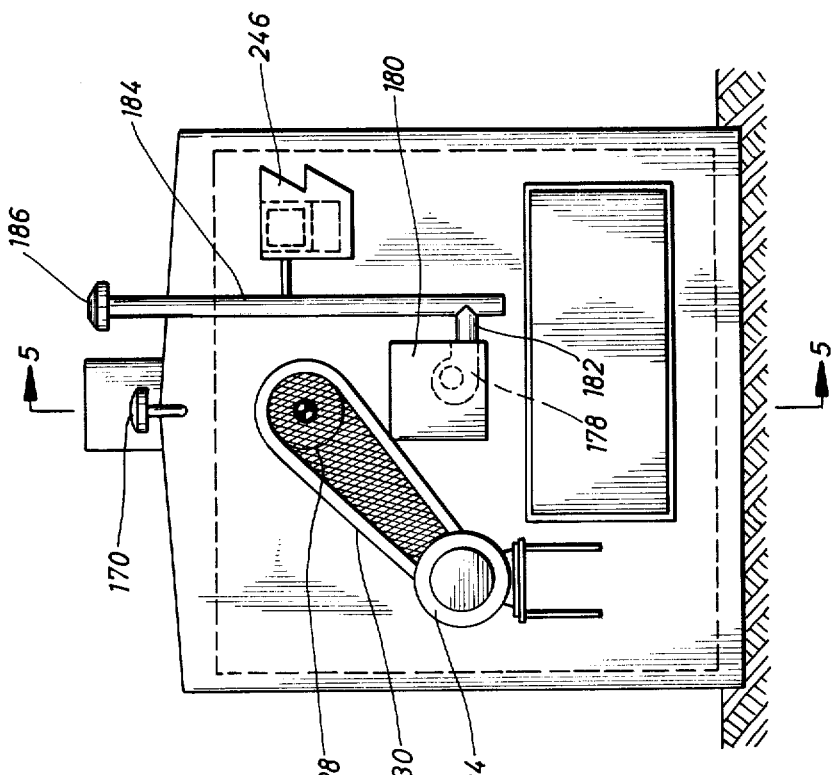

It will be desirable to provide the bearings with a cooling system in order to prevent the bearings from being rapidly deteriorated by the level of heat that is ordinarily attained by friction where cooling is not provided. In accordance with the present invention, a bearing cooling system may be provided, taking the form illustrated particularly in FIGS. 5 and 9 where a bearing cooling fluid supply manifold 168 may be provided for the enclosure. At the inlet of the manifold may be provided a filter 170 that serves to filter a cooling medium, such as atmospheric air, as it is drawn into the manifold. A plurality of connector conduits 172 may be provided for interconnecting the manifold 168 with each of the bearing enclosures 142, thereby causing the cooling medium to be conducted from the manifold into each of the bearing enclosures. In order to conduct the cooling medium away from the bearing enclosures, thereby transporting heat away from the bearings, a cooling fluid collection manifold 174 may be provided, which may be communicated with the bearing enclosures by means of a plurality of conduits 176. The manifold conduit 174 may be disposed in communication with the inlet of a blower mechanism 178, illustrated in broken line in FIG. 4, which blower mechanism may be disposed within a plenum 180. The blower 178 is effective to draw atmospheric air through the filter element 170 and into the manifold 168 where the filtered atmospheric air is transported to the bearing enclosures by means of the conduits 172. The suction action of blower 178 is effective to draw air from the bearing enclosures through conduits 176 and manifold 174 and to exhaust the air through an outlet conduit 182 of the blower where the expended coolant enters a scavenger pressure stack 184. A filter element 186 may be fixed to the outlet of the scavenger pressure stack 184 in order to filter out any smoke particles that might have entered the bearing cooling system.

It is highly desirable to prevent any leakage of contaminants into the processing zone of the enclosure, if the blower shaft seal should develop a leak for any reason. Accordingly, it is desirable to maintain the pressure within the bearing coolant system at a pressure below the pressure within the processing zone of the enclosure, thereby insuring that any leakage that takes place will cause heated and smoke laden air from the product zone enclosure to leak into the bearing coolant and scavenge system where it will be transported under influence of the blower 178 to the scavenger pressure stack 184 and will be exhausted through the filter element 186.

It is also desirable that the bearing cooling system be capable of being periodically cleaned in order to remove any accumulation of smoke particles that might have leaked past the blower shaft seals. Accordingly, the manifold conduit 174 may be provided with an extension 188 having a removable clean out enclosure secured thereto. Water, or any other suitable cleaning medium may be circulated through the bearing cooling system in order to remove any accumulation of foreign matter therefrom and the circulated cleaning medium may be removed from the bearing cooling system through the cleanout extension.

It will be desirable to provide means for achieving efficient and simple cleaning of the interior of the enclosure and to accomplish the same, a cleaning system may be employed that may conveniently take the form illustrated in FIG. 6, where a cleaning fluid supply line 192 may enter through the wall structure of the enclosure and may tee into an end wall conduit 194 that may in turn be connected by tee connections to conduits 196 and 198. Another end wall conduit 200 may also be connected by tee fittings to the conduits 196 and 198. Spray heads 202 may be connected to the various cleaning fluid supply conduits and may be operative to direct sprays of a cleaning medium, such as water or a mixture of water and a suitable cleaning fluid, to various portions of the enclosure thereby spray cleaning all of the internal surface areas of the enclosure when cleaning is desirable.

It may also be desirable to clean the internal surface areas of the ducts 86 and 88, the blowers 98 and 100 and the connecting ducts 100 and 102. Accordingly, cleaning fluid supply conduits 204 and 206 may be operative to direct a spray of cleaning fluid into the cage type blowers to wash away any foreign matter, such as smoke particles, that might have adhered thereto during operation of the smokehouse apparatus. Drain openings 208 may be provided in the lower portion of the blower housing in order to drain away cleaning fluid that may have been sprayed therein. It may be desirable to spray clean the smokehouse apparatus after each batch operation thereof and such can be accomplished simply by introducing a cleaning fluid into the supply conduit 192 simply by manually or automatically opening a cleaning fluid supply valve 210.

After the cleaning process has been accomplished it will be desirable to drain away the cleaning medium, together with any foreign matter that might have become accumulated therein during spray cleaning of the enclosure. Accordingly, the floor 54 of the enclosure may slope from each side toward the center drain 212 that is communicated with a drain conduit 214 having a water trap 216. The drain conduit may be conveniently communicated to any sewage disposal system, as desired. The lower portions of the baffels 92 may be spaced slightly above the floor 54, thereby allowing cleaning medium to flow down the interior walls of the enclosure and along the floor under the baffel toward the drain 212.

Figures 7, 8:
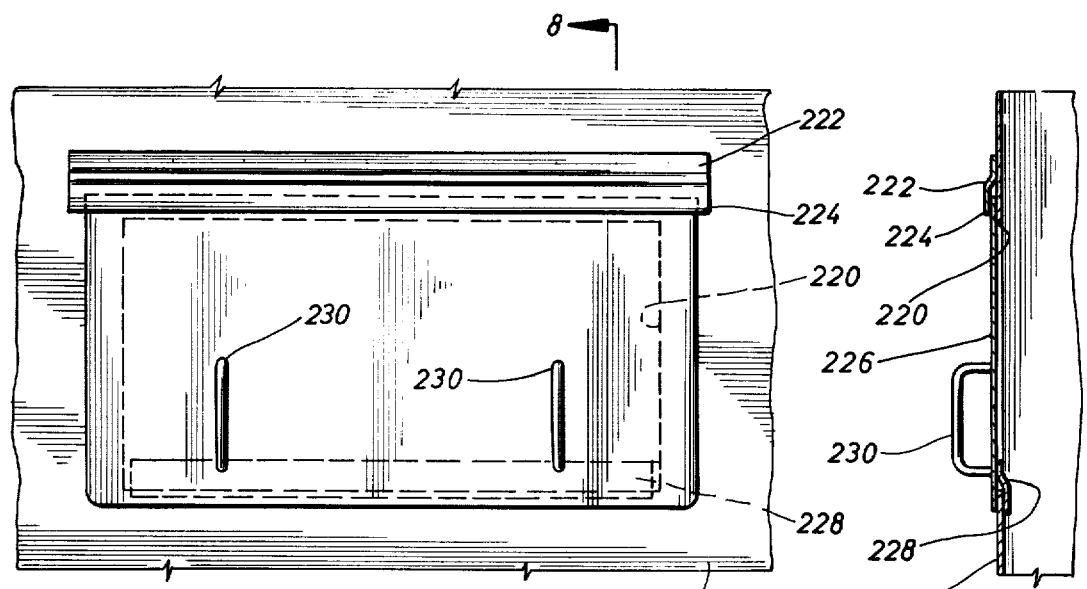

The ducts 86 and 88 may be provided with inspection openings in order to allow visual inspection of the internal portions of the ducts. As shown in FIGS. 7 and 8, inspection openings 220 may be formed in the ducts and an elongated duct closure retainer strip 222 may be secured to the upper portion of the duct immediately above the inspection opening by means of spot welds or the like. The strip 222 may be deformed in such manner as to have the lower portion 224 thereof disposed in spaced relation with the wall structure of the duct, in order to allow the upper portion of a duct closure element 226 to be inserted in the space between the strip and the duct wall. A lower closure retainer strip 228 may be spot welded or otherwise secured to the internal surface portion of the duct closure 226 at the lower portion thereof and may be formed to define a spaced relation with the lower portion of the closure, thereby allowing the wall structure of the duct to be received within the space in order that the lower portion of the structure may be retained against moving outwardly relative to the duct. A pair of handle structures 230 may be fixed to the closure element 226 to allow the closure element to be manipulated for opening and closing of the same.

When it is desired to inspect the interior of the ducts, the handles 230 of the closure element 226 are grasped and the closure element is moved upwardly causing the upper portion of the closure element to move further upwardly into the space defined by the upper closure retainer strip 222. As soon as the lower portion of the lower retainer strip 228 clears the bottom of the inspection opening, the lower portion of the closure may be pivoted outwardly and the entire closure then may be moved downwardly accomplishing complete disassembly of the closure from the duct.

It will be desirable, during operation of the smokehouse apparatus, to periodically or continuously heat the air being circulated through the blowers in order that the air may be maintained at an optimum temperature. In accordance with the present invention an electrical heating element 232 may be disposed within one or both of the blower housings 98 and 100. The heating elements may be thermostatically controlled in order to maintain heat within the enclosure at an optimum cooking temperature. For example, a temperature of 200° F may be maintained within the enclosure for a particular period of time necessary to raise the internal temperature of the food product to 140° F, at which time the food product is considered fully cooked. For example, a smoke and heat curing process for 38 millimeter ring sausage may be accomplished as follows: the ring sausage, after stuffing may be held 24 hours within a cure cooler, which lowers the internal temperature of the sausage to approximately 38° F. The sausage then may be placed within a smokehouse vestibule immediately adjacent the smokehouse where it may stand in a sanitary environment for approximately one hour at ambient temperature, after which time the sausage on carts or sausage trucks may be rolled into the smokehouse for smoke and heat processing in accordance with the following process.

| Process | Time In Mins. | Elapsed Time In Mins. |
| --- | --- | --- |
| Roll into smokehouse. | 10 | 10 |
| Cold shower on (water spray). | 5 | 15 |
| Cold shower off and turn dehumidifier on until 30% relative humidity is reached in the smokehouse. | 8 | 23 |
| Smoker turned on and left on. Temperature set at 140°F. | 20 | 43 |
| Reset temperature to 160°F. | 60 | 103 |
| Reset temperature to 190°F and turn smoker off. | 20 | 123 |
| Check internal temperature and turn temperature to 70°F. Turn cold shower on. | 5 | 128 |
| Run fans with air to cool and dry. | 10 | 138 |
| Roll trucks from house to cooler. | 8 | 146 |

As illustrated in FIG. 5, a vent assembly 240 may be provided that communicates with the enclosure. A damper mechanism 242 may be suspended by a pivot 244 within the vent and may be operative, when desired to allow venting of the enclosure. Damper 242 may be operative to maintain a positive pressure condition within the enclosure at an optimum pressure range, thereby allowing food product within the enclosure to be processed at an optimum positive pressure.

It will also be desirable to control the humidity of the heated and smoke laden air within the enclosure and to accomplish the same humidifying and dehumidifying plenum 246 may be provided for the enclosure. If it is desirable to increase the humidity within the enclosure, the plenum 246 will be operative automatically to allow introduction of outside air through appropriate filtering apparatus that will insure introduction of clean but moisture laden air into the enclosure. Likewise, if it is desired to decrease the humidity within the enclosure such may be automatically accomplished by the plenum 246.

Referring now to FIG. 11, the method of operating the smokehouse apparatus of the present invention is depicted schematically in block diagram form. From a control circuit power supply 246 the fan 248 of the scavenge system operates through energization of a simple on-off fan circuit 250. This feature allows the scavenge system to continuously cool and scavenge contaminants from the bearings within the enclosure even though the main fan and other portions of the electrical mechanism of the enclosure may be inoperative at the time. A main fan circuit 252 may be actuated to energize the main fan 254 from the control power circuit 246. The main fan may also be energized even though other portions of the control circuitry may be de-energized. In the event the product zone within the enclosure should, for any reason whatever, fail to have a proper sanitary pressure, a differential alarm switch 256 may be energized automatically through a normally open switch 258 and may be operative to simultaneously de-energize the main fan 254 and energize an alarm 260, thereby preventing operation of the apparatus until an attendant has corrected the malfunction. A heater, dehumidifier and auxiliary equipment control circuit 262 is provided which may be operative only if the control power circuit is energized and if the main fan 252 is operative, to allow energization of a heater circuit 264, a dehumidifier circuit 266 and an auxiliary service circuit 268. Each of the circuits 264, 266 and 268 may be connected to the main control circuit power through preset circuits 270, 272 and 274 respectively. If it is desirable to connect an auxiliary device, such as a smoke generator, to the smokehouse apparatus of the present invention, such may be accomplished simply by utilizing the auxiliary service circuit 268.

Referring now to FIG. 12, there is depicted a pressure gradient diagram showing pressures within the product zone and within the scavenger system of the smokehouse apparatus. These pressures are related to a datum pressure, which is the air pressure at the inlet of the main blower mechanism. Also shown in broken line is an atmospheric datum line representing atmospheric pressure. After the door of the smokehouse mechanism has been closed, there will exist a pressure within the enclosure that is slightly below atmospheric pressure. After the main fans have been energized the pressure at the discharge of the main fan will exist as shown at 276 and pressure at the heaters, downstream from the fan discharge the pressure will be reduced as shown at 278. After the flow of air reaches the turning vanes within the ducts, the pressure will have stabilized at a level slightly above atmospheric pressure until it reaches the outlet nozzles where it will begin to decrease until it reaches atmospheric pressure within the trough 90 defined by the wind deflectors 92.

Within the scavenge system, the pressure will be below atmospheric and also below the datum level established at the inlet of the blowers. As the air flows through the scavenger system it will enter the cooling ducts where it will stabilize as it passes through the bearing enclosures for cooling of the bearings. After the flow has entered the manifold 174, it decreases substantially in pressure until it reaches the inlet of the scavenge fan, where it will be returned to atmospheric pressure at the exhaust of the scavenger system fan.

It has been determined through tests that humidity within the enclosure will reach substantially 100 percent shortly after a smoke and heat curing process is initiated and, since the humidity may be maintained at substantially 100 percent, the food product disposed within the enclosure will not be subjected to severe weight loss by water evaporation. It has been determined that ring sausage, processed in accordance with the present invention, will retain between 95 and 99 percent of its original weight during the smoke and heat curing process identified above. The fully cooked and cured product, will be in the order of 21 percent heavier than an identical food product cured in accordance with conventional methods. The commercial feasibility of smoke and heat cured food products is greatly enhanced by the processing of such products with the apparatus and in accordance with the methods set forth herein.

In view of the foregoing, it is clearly apparent that the present invention provides novel smokehouse apparatus for smoke and heat processing of food products which effectively attains all of the objects here and above set forth, together with other objects and advantages which will become obvious and inherent from a description of the apparatus itself. It will be understood that certain combinations and subcombinations are of utility and may be employed without reference to other features and subcombinations. As many possible embodiments may be made of the present invention without departing from the spirit or scope thereof, it is to be understood that all matters herein set forth or shown in the accompanying drawings are to be interpreted as illustrative and not in a limiting sense.

What is claimed is:

1. Apparatus for smoke and heat processing of food products, said apparatus comprising:
   side walls, end walls, a ceiling and a floor defining an enclosure within which smoke laden heated air is contained and having at least one opening through which food products may be introduced into said enclosure for the purpose of smoke and heat processing;
   a door assembly interfitting within said opening and forming a sealed closures for said opening, said food products being inserted and removed from said enclosure through said door assembly;
   duct means disposed adjacent the upper portion of at least one of said side walls and having downwardly directed air outlet means supported thereby and oriented linearly along said one side wall, said outlet means directing a flow of heated and smoke laden air downwardly along said one side wall toward said floor;
   blower means supported by said enclosure and having intake means communicating with said enclosure and exhaust means communicating with said duct means; and
   baffle means extending upwardly from said floor and extending linearly along the base of said one wall in spaced relation therefrom, said baffle means cooperating with said side wall and with said floor to define a shallow elongated trough in the bottom of said enclosure and generally below the level of that portion of the enclosure in which the food products are to be placed, siad trough constructed to receive downwardly directed air from said air outlet means and deflect the air back upwardly and cause air to flow inwardly laterally through the food products disposed within said enclosure.

2. Apparatus for smoke and heat processing of food products as recited in claim 1:
   said blower means being disposed intermediate the side walls of said enclosure means, and said exhaust means of said blower means being communicated with said duct means, said intake means of said blower means being disposed within the upper portion of said enclosure whereby smoke laden air being diffused and directed upwardly by said trough will be drawn laterally inwardly and upwardly through the food product and will enter the intake of said blower means.

3. Apparatus for smoke and heat processing of food products as set forth in claim 2, wherein:
   said blower means includes:
   a blower element;
   a driven shaft driving said blower element; and at least one bearing supporting said shaft for rotation; and
   shield means enclosing said bearing and completely isolating said bearing from said duct means and said enclosure.

4. Apparatus for smoke and heat processing of food products as recited in claim 3, including:
   a fluid supply system having a source of cooling fluid; and conduit means communicating said fluid supply system with said shield means and providing a flow of cooling fluid for the purpose of cooling said bearing, said conduit means being isolated from said duct means and said enclosure.

5. Apparatus for smoke and heat processing of food products as recited in claim 4, wherein:
   the pressure of said fluid supply system is maintained below the pressure of the smoke laden air within said enclosure.

6. Apparatus for smoke and heat processing of food products, said apparatus comprising:
   side walls, end walls, a ceiling and a floor defining an enclosure within which smoke laden heated air is contained and having at least one opening through which food products may be introduced into said enclosure for the purpose of smoke and heat processing;
   a door assembly interfitting within said opening and forming a sealed closure for said opening, said food products being inserted and removed from said enclosure through said door assembly;
   a pair of duct means, one each beneath the ceiling and adjacent the upper portion of said respective side walls and each having downwardly directed air outlets oriented linearly along said side walls to direct a flow of heated and smoke laden air downwardly along the respective said side walls toward said floor;
   blower means supported by said enclosure and having intake means communication with said duct means, said blower means developing an area of pressure depression at the upper central portion of said enclosure to cause upward flow of air toward the intake means of said blower means; and
   a pair of baffle means extending upwardly from said floor and extending linearly along said floor and extending linearly along said respective side walls each in spaced relation thereto, said baffle means cooperating with the respective side walls and with said floor to define a pair of elongated troughs for receiving downwardly directed air from the respective duct means, each trough operable to deflect a portion of the downwardly directed air upwardly and back toward the duct thereby to create an inward and lateral flow of air through food products disposed within said container.

7. Apparatus for smoke and heat processing of food products as recited in claim 6, wherein said blower means comprises a pair of blowers, one for each duct means; and motor means drivingly connected to each of said blowers and inducing simultaneous operation of said blowers.

8. Apparatus for smoke and heat processing of food products, said apparatus comprising:

side walls, end walls, a ceiling and a floor defining an enclosure within which smoke laden heated air is contained and having at least one opening through which food products may be introduced into said enclosure for the purpose of smoke and heat processing;

a door assembly interfitting with said opening and forming a sealed closure for said opening, said food products being inserted and removed from said enclosure through said door assembly;

duct means disposed adjacent the upper portion of said enclosure and having a downwardly directed air discharge outlet directing a flow of heated and smoke laden air downwardly toward said floor;

blower means supported by and within said enclosure and having intake means communication with said enclosure and exhaust means communication with said duct means, said blower means including a blower element, a driven shaft driving said blower element, and at least one bearing supporting said shaft for rotation;

shield means enclosing said bearing and completely isolating said bearing from said duct means and said enclosure;

a fluid supply system having a source of cooling fluid; and conduit means communicating said fluid supply system with said shield means and providing a flow of cooling fluid for the purpose of cooling said bearing, said conduit means being isolated from said duct means and said enclosure.

9. Apparatus for smoke and heat processing of food products as recited in claim 8, wherein;

the pressure of said fluid supply system is maintained below the pressure within said enclosure.

* * * * *